United States Patent [19]

Yoshimoto et al.

[11] Patent Number: 4,757,516
[45] Date of Patent: Jul. 12, 1988

[54] TRANSVERSAL EQUALIZER

[75] Inventors: Makoto Yoshimoto; Seiichi Noda, both of Tokyo, Japan

[73] Assignee: NEC Corporation, Tokyo, Japan

[21] Appl. No.: 911,937

[22] Filed: Sep. 26, 1986

[30] Foreign Application Priority Data

Sep. 30, 1985 [JP] Japan .................................. 60-218381

[51] Int. Cl.$^4$ .............................................. H03H 7/30
[52] U.S. Cl. ........................................ 375/15; 367/45; 333/28 R
[58] Field of Search .................... 375/11, 12, 13, 14, 375/15; 364/824, 724; 333/18, 28 R; 367/45

[56] References Cited

U.S. PATENT DOCUMENTS 3,521,041  7/1970  Van Blerkom et al. ............. 364/724
4,191,853  3/1980  Piesinger ............................ 364/724
4,263,671  4/1981  Chiu et al. .......................... 375/15

Primary Examiner—Michael A. Masinick
Assistant Examiner—Andrew J. Telesz, Jr.
Attorney, Agent, or Firm—Sughrue, Mion, Zinn, Macpeak & Seas

[57] ABSTRACT

An equalizer is provided with a branching device for branching a digitally modulated signal into two outputs. A series of weighting devices weights one of the outputs of the branching means, and a series of second weighting devices equal to or fewer in number than the first weighting devices weights the remaining output of the branching means. Combining elements equal in number to the first weighting devices combine two or three inputs, and delaying means fewer in number than the combining elements are interconnected with the combining elements in a sequential, alternating manner. The outputs of the first weighting devices are respectively applied to the combining elements while those of the second weighting devices are respectively applied to selected ones of the combining elements. The invention provides a construction where the number of taps of the equalizer may be easily increased without creating the necessity of combining circuits having an increased number of inputs.

1 Claim, 1 Drawing Sheet 4,757,516

TRANSVERSAL EQUALIZER

BACKGROUND OF THE INVENTION

The present invention relates to an equalizer and, more particularly, to a transversal equalizer which is applicable to the intermediate frequency band.

A transversal equalizer is used to equalize propagation distortion of digitally modulated signals in the intermediate frequency (IF) band.

The prior art transversal equalizer is made up of a plurality of delay circuits for sequentially delaying a digitally modulated IF input signal, a plurality of first weighting circuits for respectively weighting the modulated input signal and the real components of output signals of the delay circuits, a plurality of second weighting circuits for respectively weighting the modulated input signal and the imaginary components of the output signals, a first combining circuit for combining the outputs of the first weighting circuits, a second combining circuit for combining outputs of the second weighting circuits, and a third combining circuit for orthogonally combining the outputs of the first and second combining circuits.

In a construction of the type described, the number of inputs to the first or the second combining circuits increases with the number of taps of the equalizer since these are always equal in numbers. A combining circuit with many inputs results in a complicated device that suffers from aggravation of the level loss as well as deterioration of the frequency characteristics. Therefore, as the number of taps increases, the prior art equalizer becomes impracticable.

SUMMARY OF THE INVENTION

It is therefore an object of the present invention to provide an equalizer in which the number of inputs to the combining circuit does not increase beyond a predetermined limit despite any increase in the number of taps.

An equalizer in accordance with the present invention comprises branching means for branching a digital modulated signal into two outputs which are orthogonal to each other, at least three first weighting means for weighting one of the outputs of the branching means, a number of second weighting means which are equal or fewer in number than the first weighting means, for weighting the remaining output of the branching means, combining means equal in number to the first weighting means, for combining two or three inputs, and delaying means fewer in number by one than the combining means. The combining means and delaying means are interconnected sequentially and alternately. The outputs of the first weighting means are respectively applied to the combining means while those of the second weighting means are respectively applied to selected ones of the combining means.

DETAILED DESCRIPTION OF THE INVENTION

To better understand the present invention, reference will be made to a prior art equalizer, shown in FIG. 1.

The prior art equalizer comprises delay circuits $T_{-1}$, $T_0$, $T_1$ and $T_2$, each adapted to sequentially delay a digital modulated IF input signal by a predetermined time T, weighting circuits $R_{-2}$, $R_{-1}$, $R_0$, $R_1$ and $R_2$ for respectively weighting the input signal 101 and outputs of the delay circuits $T_{-1}$, $T_0$, $T_1$ and $T_2$, weighting circuits $I_{-2}$, $I_{-1}$, $I_1$ and $I_2$ for respectively weighting the input signal 101 and the outputs of the delay circuits $T_{-1}$, $T_1$ and $T_2$, a combining circuit $A_3$ for combining the outputs of the weighting circuits $R_{-2}$, $R_{-1}$, $R_0$, $R_1$ and $R_2$, a combining circuit $A_4$ for combining the outputs of the weighting circuits $I_{-2}$, $I_{-1}$, $I_1$ and $I_2$, and a combining circuit $A_5$ for orthogonally combining the outputs of the combining circuits $A_3$ and $A_4$ to produce an output signal 102.

Figure 1:
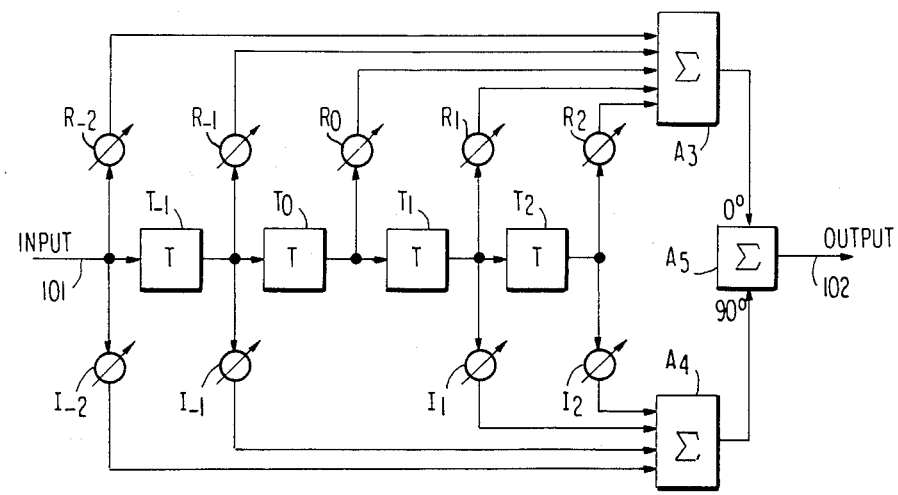
FIG. 1 is a block diagram showing an example of a prior art equalizer.

The prior art equalizer of FIG. 1 serves as a five-tap equalizer in which each of the weighting circuits is controlled by a control signal (not shown) to equalize distortions of the input signal (for example, a quadrature amplitude modulated wave) and, thereby, produce the output signal 102. The number of inputs to the combining circuit $A_3$ is the same as the number of taps, i.e. five.

Likewise, a prior art n-tap equalizer has to be provided with a combining circuit having n inputs. Such an equalizer is undesirable for the reasons previously discussed. For details of a prior art equalizer, reference may be made to U.S. Pat. No. 4,453,256 issued on June 5, 1984.

Figure 2:
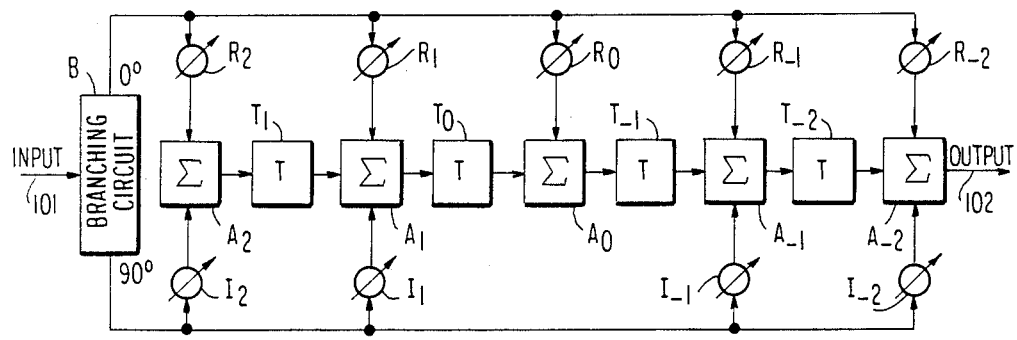
FIG. 2 is a block diagram of an equalizer embodying the present invention.

Referring to FIG. 2, an equalizer in accordance with the present invention is shown which is free from the drawbacks particular to the prior art equalizer as discussed above. As shown, the equalizer of the present invention includes a branching circuit B which divides a digital modulated IF input signal 101 into two outputs which are different in phase by 90 degrees from each other. One of the outputs of the branching circuit B is weighted by weighting circuits $R_2$, $R_1$, $R_0$, $R_{-1}$ and $R_{-2}$ while the other is weighted by weighting circuits $I_2$, $I_1$, $I_{-1}$ and $I_{-2}$. The equalizer further includes combining circuits $A_2$, $A_1$, $A_0$ and $A_{-1}$, $A_{-2}$, and delay circuits $T_1$, $T_0$, $T_{-1}$ and $T_{-2}$ to which a predetermined delay time T is assigned. The combining circuits $A_2$ to $A_{-2}$ and the delay circuits $T_1$ to $T_{-2}$ are interconnected sequentially and alternately. The outputs of the weighting circuits $R_2$ to $R_{-2}$ are applied to the combining circuits $A_2$ to $A_{-2}$, respectively, and those of the weighting circuits $I_2$, $I_1$, $I_{-1}$ and $I_{-2}$ to the combining circuits $A_2$, $A_1$, $A_{-1}$ and $A_{-2}$, respectively.

The equalizer constructed as shown in FIG. 2 is operated as follows.

Concerning the signal path which extends through the weighting circuit $R_2$, the input signal 101 is branched in the same phase by the branching circuit B, then weighted by the weighting circuit $R_2$, and then routed through the alternating combining circuits $A_2$ to $A_{-2}$ and delay circuits $T_1$ to $T_{-2}$ to become one component of the output signal 102 which is delayed by a time 4T. In the signal path extending through the weighting circuit $I_2$, the input signal 101 is branched by the circuit B with the phase shifted by 90 degrees, then weighted by the weighting circuit $I_2$, and then delayed by a time 4T to become another component of the output signal 102.

Meanwhile, in the prior art equalizer as shown in FIG. 1, concerning the signal path which extends through the weighting circuit $R_2$, the input signal 101 is delayed by a time 4T by the delay circuits $T_{-1}$ to $T_2$, then branched into two, and then combined in the same phase by the combining circuits $A_3$ and $A_4$ to become a component of the output signal 102. In the signal path extending through the weighting circuit $I_2$, the input signal 101 is delayed by a time 4T, then branched into two with the phase shifted by 90 degrees, and then combined to become a component of the output signal 102. Hence, so far as the components of the output signal 102 which are respectively routed through the weighting circuits $T_2$ and $I_2$ are concerned, the prior art equalizer shown in FIG. 1 and the equalizer of the present invention shown in FIG. 2 are identical with each other except for the relationship in order among the weighting operations the combining operations and the four-period delaying operation or the 90-degree phase shifting operation. Likewise, all the signal components which are routed through the weighting circuits, other than $R_2$ and $I_2$ in both the prior art circuitry and the circuitry of the present invention are the same.

It will be seen from the above that the equalizer in accordance with the embodiment of FIG. 2 serves as a five-tap equalizer.

In the particular embodiment of FIG. 2, use is made of combining circuits $A_1$, $A_{-1}$ and $A_{-2}$ each having three inputs and combining circuits $A_2$ and $A_0$ each having two inputs. Alternatively, in order to use a single type of combining circuit, the circuits $A_2$ and $A_0$ may each be implemented with a circuit having three inputs one of which is made "0".

The equalizer of the present invention may be provided with any desired number of taps greater than three by increasing or decreasing the numbers of weighting circuits, combining circuits and delay circuits in each number to the number of taps.

While the equalizer of the present invention uses a branching circuit, the branching circuit can be implemented with a buffer amplifier and is far easier to construct than a combining circuit.

In summary, it will be seen that an equalizer in accordance with the present invention can be produced with ease since the number of inputs required of a combining circuit is only two or three regardless of the number of taps. Furthermore, such an equalizer is suitable for production as an integrated circuit since, no matter how great the number of taps may become, it is necessary only to sequentially arrange the same number of circuit blocks, each consisting of a weighting circuit, a delay circuit and a combining circuit for combining their outputs, as the number of taps.

What is claimed is:

1. An equalizer for equalizing distortion of a digitally modulated signal in an intermediate frequency band, comprising:

branching means for dividing a digitally modulated signal into two outputs which are orthogonal to each other;

at least three first weighting means for weighting a first of the outputs of said branching means;

second weighting means not greater in number than said first weighting means, for weighting the other of said outputs of said branching means;

combining means equal in number to said first weighting means and delaying means fewer in number by one than said combining means;

said combining means and said delaying means being interconnected sequentially and alternatively, such that an output of any one of said delaying means is applied as an input to the next sequential one of said combining means;

each of said first weighting means having an output applied as an input to a respective one of said combining means; and each said second weighting means having an output applied as an input to a selected one of said combining means, and wherein the number of said inputs to any one of said combining means is no greater than three.

* * * * *

UNITED STATES PATENT AND TRADEMARK OFFICE
CERTIFICATE OF CORRECTION

PATENT NO.  : 4,757,516

DATED       : July 12, 1988

INVENTOR(S) : 4,757,516

It is certified that error appears in the above-identified patent and that said Letters Patent is hereby corrected as shown below:

COLUMN 2, LINE 23    Delete "n-tap" and insert --$\underline{n}$-tap--.

COLUMN 2, LINE 24    Delete "n" and insert --$\underline{n}$--.

Signed and Sealed this

Twenty-seventh Day of December, 1988

Attest:

DONALD J. QUIGG

Attesting Officer        Commissioner of Patents and Trademarks